July 6, 1965 G. A. WAHLMARK 3,192,868
DRIVE CONNECTION FOR FLUID DEVICE
Filed Aug. 22, 1961 4 Sheets-Sheet 1 fig.1.

INVENTOR.
Gunnar A. Wahlmark,
BY
Byron, Hume, Groen & Clement
Attorneys.

July 6, 1965  G. A. WAHLMARK  3,192,868
DRIVE CONNECTION FOR FLUID DEVICE
Filed Aug. 22, 1961  4 Sheets-Sheet 2 fig.2.

INVENTOR.
Gunnar A. Wahlmark,
BY
Byron, Hume, Groen & Clement
Attorneys.

INVENTOR.
Gunnar A. Wahlmark,
BY
Byron, Hume, Groen & Clement
Attorneys.

3,192,868
DRIVE CONNECTION FOR FLUID DEVICE
Gunnar A. Wahlmark, 211 S. Rockford Ave.,
Rockford, Ill.
Filed Aug. 22, 1961, Ser. No. 133,233
11 Claims. (Cl. 103—162)

This invention relates in general to fluid devices and more particularly to power transmission apparatus of the fluid type. It deals specifically with improvements in a swash plate type hydraulic device.

Swash plate devices have been generally well known in the power transmission field for years. For example, Patent No. 1,062,071, "Speed Adjusting Means for Rotary Hydraulic Devices," May 20, 1913, issued to H. B. Williams et al. discloses a hydraulic pump embodying the principles of swash plate construction. Generally speaking, in pumps of this nature, an obliquely mounted swash plate universally connected to a rotatable drive shaft rotates and drives a series of annularly disposed pistons which might pump hydraulic fluid in a closed circuit, for example.

The converse of such a swash plate type hydraulic pump is a swash plate fluid motor construction. When the swash plate principle is adapted to fluid motors, it is common practice to drivingly connect the swash plate to a power takeoff shaft. The plate and consequently the shaft are then rotatably driven by an annularly disposed series of obliquely extending pistons powered by motive fluid.

It will be readily understood that in swash plate devices such as those hereinbefore referred to, cylinder displacement is a function of, among other things, the angle at which the axis of rotation of the piston carrying cylinder block is offset from the axis of rotation of the swash plate. Obviously, the greater the angle, the longer the stroke and consequently the greater the displacement.

In addition, in the case of a hydraulic motor embodying the swash plate concept, the force component effective to drive the swash plate decreases relatively as the angle between the axis of rotation of the piston carrying cylinder block and the drive shaft carried swash plate approaches zero. Consequently, as will readily be seen, the output torque of the drive shaft decreases rapidly by virtue of a decreasing effective force component and, in conjunction therewith, decreasing cylinder displacement as the angle between the aforedescribed axes decreases.

The construction of swash plate hydraulic devices which have been developed and are known to date is substantially limiting insofar as the maximum permissible angle between the axes of the driven and driving components is concerned. An angle of about 30° is the maximum found practicable with such constructions and consequently a device incorporating this maximum angle or less is considered conventional. A primary limiting factor, among others, in this respect has been the mechanics of construction of the drive connection between a piston carrying cylinder block and an obliquely disposed swash plate.

Normally ball and socket joints connect the piston rods extending from a cylinder block to the adjoining face of a swash plate. It is common practice to provide 180° sockets in the plate itself and secure corresponding ball joints, carried by the piston rods, to the sockets with an overlying face plate or the like. Such a construction is shown in my Patent No. 3,136,264, issued June 9, 1964, and entitled "Variable Displacement Fluid Device." Due to the restriction of such a face plate construction, the maximum angle which can be established between the axes of the piston rods and the axis of rotation of a swash plate, without necking the piston rods down severely adjacent the ball connection, is in the neighborhood of about 30°. This is because the rod contacts an edge of the overlying plate before exceeding or sometimes even reaching an angle in the neighborhood of about 30°. If the piston rod is necked down severely, a substantially weakened rod arrangement results and the construction is subject to sudden piston rod failures.

Of course, it will be understood that the face plate construction is not the only means known for completing a ball joint connection in swash plate type fluid devices but it is exemplary and the problems inherent therein are found generally in other known constructions. For example, in the Wahlmark patent entitled "Piston," No. 2,956,845, issued October 18, 1960, a retaining set ring type ball joint construction is utilized. As will readily be seen, however, this ring construction limits the maximum piston rod angle every bit as much as the aforedescribed face plate construction. Consequently, angles in the neighborhood of about 30° between the rods and the face plate are the maximum obtainable.

An object of the invention is to provide a new and improved drive connection in a swash plate type power transmission device.

Another object is to provide a drive connection in a swash plate type power transmission device which achieves higher efficiency using smaller cylinder bores.

Still another object is to provide a drive connection which facilitates the establishment of a 45° drive angle between the axes of rotation of a swash plate and associated cylinder block.

Yet another object is to provide improved lubrication of the drive connection between the swash plate and piston rods.

Another object is to provide a drive connection which is simple and economical in construction and facilitates easy assembly, disassembly and maintenance.

Still another object is to provide a fluid motor embodying the swash plate concept which delivers a relatively higher drive shaft torque output than similar motors heretofore known.

A further object is to provide a drive connection for a swash plate type power transmission device which facilitates a maximum of dimensional tolerance between swash plate and cylinder block without untoward effects.

An additional object is to provide a swash plate device in which the only stock between piston sockets in the swash plate is that required for strength between the sockets themselves.

Another object is to provide a swash plate device having piston sockets substantially greater than hemispherical formed in an integral swash plate.

Still another object is to provide a swash plate device utilizing piston ball ends of relatively larger diameter than previously possible.

Yet another object is to provide a drive connection including means adaptable to variations in the effective distance between a swash plate and a cylinder block brought about by angular variations therebetween in a variable displacement pump.

Still a further object is to provide a drive connection including ball and socket universal joint means having unique locking means associated therewith.

The above and other objects are realized in accordance with the present invention by providing a new and improved drive connection for a swash plate type power transmission device. Briefly, the invention contemplates a simplified drive connection wherein sockets over 180° are provided in a swash plate, and ball type joints forming the free ends of the cylinder carried pistons are adapted to be slidably inserted in corresponding sockets in one attitude and then moved to an operative attitude where they are universally but unremovably connected in driving relationship with the swash plate. The unitary swash plate and socket construction permits an angle of in the neighborhood of 45° to be established between the axes of rotation of the swash plate and the cylinder block. Unique locking means are provided between each ball and socket when the drive connection is incorporated in a variable displacement pump. The construction embodying this invention also facilitates improved lubrication of the ball and socket joints and permits substantial axial dimensional variation in the relationship between the swash plate and cylinder block without effecting operation of the device.

To simplify the explanation of this invention, the disclosure and discussion is generally confined to a description of a fluid type motor of the swash plate type. In addition, the motor described is of the hydraulic variety. In certain specific instances, however, reference is made to the features of this invention specifically applicable to variable displacement pumps and it should be kept in mind that the principles apply in many instances to other power transmission devices embodying the swash plate concept as well and should not be limited to hydraulic motors or even to fluid motors generally.

The invention, both as to its organization and method of operation, taken with further objects and advantages thereof, will best be understood by reference to the following description taken in connection with the accompanying drawings, in which.

Figure 1:
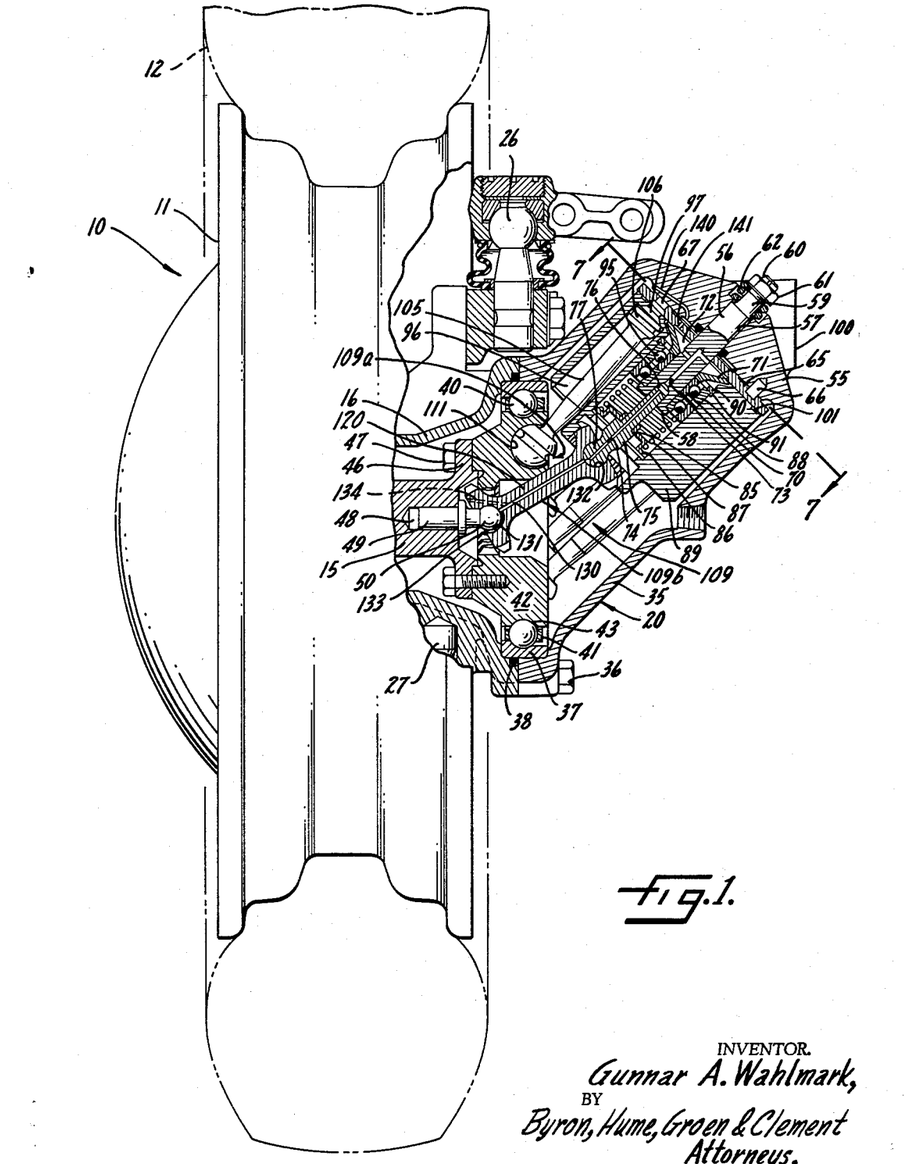
FIGURE 1 is a front elevational view, in partial section, of a vehicle wheel and an associated swash plate type fluid motor including a drive connection embodying this invention.

Referring to the drawings and particularly to FIGURE 1, a conventional vehicle wheel is shown generally at 10. The wheel 10 includes a rim 11 carrying a tire 12 and rigidly secured to a conventional brake drum (not shown) in a well known manner.

The wheel 10 through the aforedescribed brake drum, is mounted for rotation with a stub axle 15. Surrounding the axle 15 is a housing 16 which is fixed relative to the wheel 10 and rotatably supports the axle in a conventional manner. Rigidly mounted on the housing 16 in driving relationship with the axle 15 is a swash plate type hydraulic motor 20, according to this invention.

Figures 2, 3, 4:
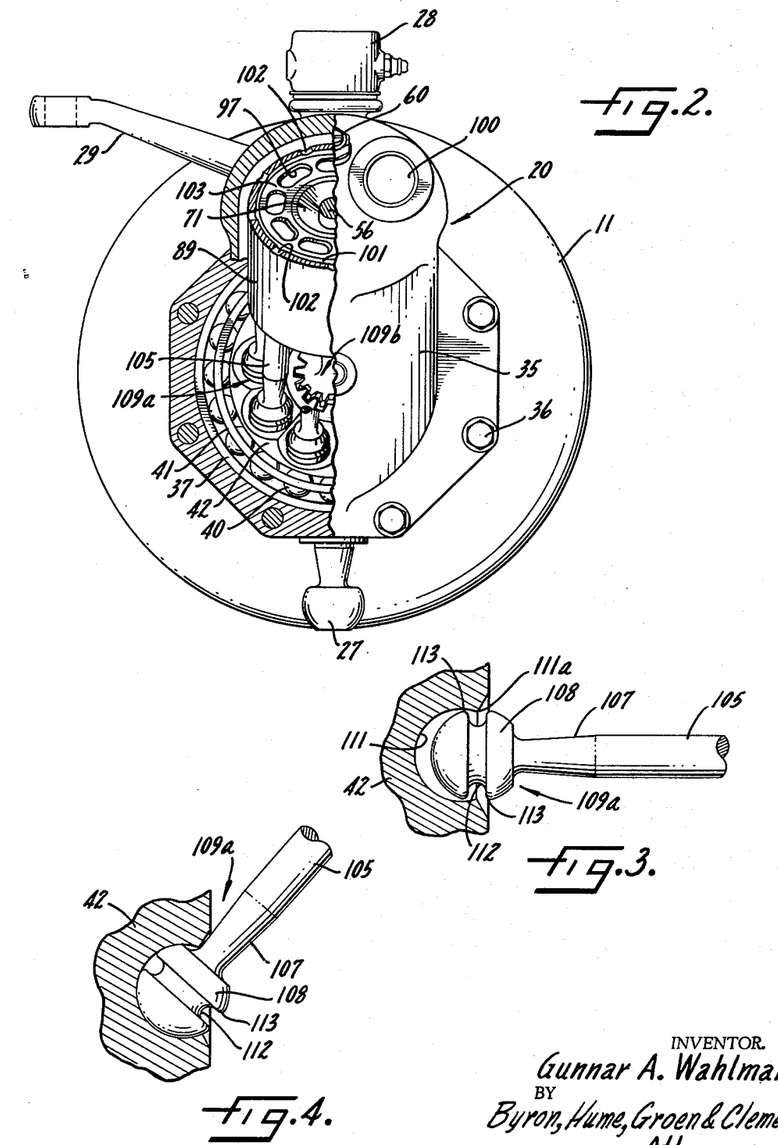
FIGURE 2 is a side view of the fluid motor shown in FIGURE 1, with parts broken away.
FIGURE 3 is an enlarged fragmentary view showing the ball and socket drive connection as it is assembled.
FIGURE 4 is a view similar to FIGURE 3 showing the ball and socket drive connection in its assembled, operative relationship.

The wheel 10 and the associated motor 20 form a self-contained unit and might support a frame of a conventional automobile, for example, in any of a number of well known ways. A steered front wheel is illustrated in this disclosure and might include a mounting 25 forming an integral part of and extending from the housing 16. The mounting 25 carries an upwardly extending ball joint 26 as best seen in FIGURE 1, and a downwardly extending ball joint 27 as best seen in FIGURE 2. The ball joints 26 and 27 are normally connected to the frame of a vehicle through linkages which are exemplified by the linkage 28. A steering arm 29 might be rigidly connected to the mounting 25 and incorporated in a steering linkage (not shown). The aforedescribed wheel mounting is of generally conventional and well known construction and does not form any part of this invention. Accordingly, a more detailed description is not thought to be necessary. Suffice it to say that the wheel 10 and the motor 20, as a unit, turn about and are supported on the ball joints 26 and 27.

As previously pointed out, the motor 20 is of the swash plate type fluid motor construction. It includes a casing 35 secured to the housing 16 about its open end by bolts 36. At the juncture of the housing 16 and the casing 35 and seated there within is an appropriately mounted annularly extending bearing outer race 37. The bearing race 37 is fixed relative to the housing 16 and the casing 35 and a fluid seal is provided between these three members in the form of a conventional O-ring 38.

Mounted for rotation within the confines of the bearing outer race 37 on ball bearings 40 carried in a ball bearing cage or ring 41 is a generally ring-shaped swash plate 42 having a self-contained bearing inner race 43 extending about its periphery. The swash plate 42 is rigidly connected to a flared portion 46 on the stub axle 15 by bolts 47 in a conventional manner.

A bore 48 in the axle 15 carries a snugly seated pin 49 having a universal ball joint 50 forming its outermost extremity. The significance of this ball joint 50 and its relationship to the drive connection forming the basis for this invention will be hereinafter explained. As will be readily apparent, the swash plate 42 is the driven member of the motor 20, corresponding generally to the crank shaft of a conventional reciprocating engine, for example.

The driving portion of the motor 20 is mounted in the casing 35 and is carried by the closed end 55. A bolt 56 extends through a hole 57 in the end 55 and into the casing. The bolt 56 extends generally axially of the casing 35 and includes a lip 58 at its inner end and a reduced section 59 carrying screw threads 60 adjacent its outer end. A nut 61 is turned on the threads 60 and a coil spring 62 surrounds the reduced section 59 of the bolt. The coil spring 62 bears against the nut 61 and tends to urge the bolt 56 outwardly of the casing 35.

Fixedly seated within the casing 35 against the inner side of the closed end 55 is a porting plate 65. The porting plate 65 is secured to the casing 35 by pins 66 and has a pair of annularly disposed kidney ports 67 extending therethrough.

Figure 7:
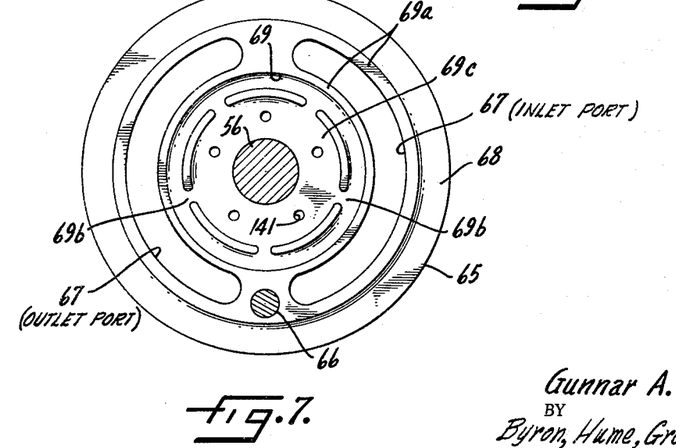
FIGURE 7 is a view taken along line 7—7 of FIGURE 1, with parts broken away.

As is best seen in FIGURE 7, the kidney ports 67 include a fluid pressure inlet port and a fluid pressure outlet port. Surrounding the kidney ports 67 is an annularly extending depression 68 in communication with the edge of the plate 65. Within the encircling kidney ports 67 a channel 69 is formed. The channel 69 and depression 68 define a land 69a between them in surrounding relationship with each port 67. The channel 69 is in communication through transversely extending channels 69b with a depression 69c concentric with the bolt 56. The significance of the land 69a and its relation to the operation of the hydraulic motor 20 will be discussed in detail in the description of the operation of the motor. Suffice it to say for the present that it reduces the upper surface area of the porting plate which is subjected to cylinder head pressure below a critical value and consequently prevents the effect of pressure within the cylinders from tending to force the plate 65 away from the inner side of the end wall 55.

Carried between the lip 58 on the end of the bolt 56 and the porting plate 65 is a bearing assembly including identical bearing inner races 70. The bearing inner races 70 bear against a cup-shaped spacer element 71. The depression 72 formed within the cup-shaped element 71 is in communication with a branched lubrication conduit 73 within the bolt 56. The lubrication conduit 73 is in communication, in turn, with a lubrication conduit 74 within a pin 75 snugly seated in a recess 76 axially disposed in the inner end of the bolt 56. The conduit 74 terminates at the outer periphery of the ball joint 77 at the end of the pin 75. The significance of the lubrication conduit 73 and 74 will be hereinafter explained in detail.

Seated on a ledge 85 surrounding the pin 75 is a retaining member 86 upon which is seated a coil spring 87. The coil spring 87 biases a pair of outer bearing races 88, snugly seated within a cylinder block 89, upwardly against a retaining ring 90. The ring 90 is held in an annular recess 91 within the cylinder block 89.

It will now be readily seen that the cylinder block 89 is mounted for rotation about bolt 56 on ball bearings 95 carried between the bearing outer races 88 and the bearing inner races 70.

The cylinder block or barrel 89 preferably has nine cylinder bores 96 formed therein. However, it will be understood, that more or less cylinders might be utilized in a fluid device of this type. As is best seen in FIGURE 2, each cylinder bore 96 has a fluid access port 97. The ports 97 are disposed in such a manner that they underlie the kidney ports 67 formed in the porting plate 65. The inlet kidney port 67 is connected with a fluid inlet pipe 100 in the casing 35 while the outlet port 67 is connected to a fluid outlet pipe (not shown) disposed directly opposite the pipe 100 on the closed end 55 of the casing.

Surrounding the ports 97 on the top of the cylinder block 89 is an annular channel 101. Radially disposed channels 102 provide communication between the channel 101 and the space within the casing 35 surrounding the cylinder block 89, which space remains under atmospheric or casing pressure. Referring to FIGURE 1, a land 103 remains surrounding the access ports 97. The annular inside edge of the land 103 is separated from the outer periphery of the cup-shaped spacer element 71 such that the under surface of the porting plate 65, on the circular line along which it communicates with the separation between the annular inside edge of land 103 and the outer periphery of cup-shaped element 71, is in communication with the core formed within the cylinder block 89 and consequently with an area which is under substantially atmospheric or casing pressure.

The surface area of the land 103 surrounding the access ports 97 is particularly significant in relation to the effective transverse surface area of the interior of the cylinder bores 96, which transverse surface area surrounds the access ports 97 within the bores 96. The significance of this area relationship will be discussed in detail in the explanation of the operation of this motor. In general, again suffice it to say for the present that the upper surface area of the cylinder block which is subjected to cylinder head pressure is reduced below a critical value and consequently prevents the effect of pressure within the cylinders from tending to force the cylinder block 89 away from the under surface of the porting plate 65.

Nine piston rods 105, each having a piston head 106, are seated within the cylinder bores 96 and extend outwardly therefrom. The piston heads are preferably constructed as described in the aforementioned Wahlmark Patent No. 2,956,845. The rods 105 each have necked down portion 107 adjacent their outer ends and a universal spherical ball joint 108 at the outer extremity of the necked down portion.

In general, the construction which has been described to this point forms no specific part of this invention. As fluid under pressure, hydraulic fluid for example, enters the inlet pipe 100 and passes through the inlet kidney port 67 associated therewith, it drivingly impinges on the piston heads 106 lying forward of top dead center and forces these pistons outwardly toward bottom dead center. It is this outwardly directed force of the pistons 105 that provides the driving force for the swash plate 42 and consequently the wheel 10. As the pistons move the cylinder block 89 rotates on the anti-friction bearings 95.

The swash plate 42 reacts in turn upon the pistons 105 which are rearward of bottom dead center to force these pistons inwardly of their corresponding cylinder bores and consequently toward top dead center. The fluid in the latter cylinder bores is forced outwardly through corresponding access ports 97 and outlet kidney port 67 to the outlet pipe (not shown) to be recirculated through any suitable type of fluid pump (not shown) which pressurizes the fluid and delivers it to the inlet pipe 100 of the motor 20 again.

Since a swash plate type fluid motor of the type generally described above is known in the art a detailed description of its use and operation is not thought to be necessary. In brief, the pistons 105 on the forward or driving side of the motor 20 provide a rotating or driving component of force on the swash plate 42, while those on the opposite or rearward side are forced upwardly into their corresponding cylinder bores by the swash plate to return the fluid therein through a closed circuit to a fluid pump where, as has been pointed out above, it is pumped again to the inlet pipe 100 and the power side of the motor 20.

As has previously been pointed out, the surface area of the land 69a on the upper surface of the portion plate 65 must be less than a critical value. Consequently, it is established at a value slightly less than twice the effective transverse surface area of the interior of cylinders 96, which effective surface area is that transverse area surrounding the access ports 97 therein. As is well known in the art, the force tending to separate the porting plate 65 from the closed end 55 of the casing 35 is equal to the cylinder pressure plus the casing pressure times the surface area of the land 69a divided by two. This, in effect, is the average of the cylinder pressure and casing pressure times the surface area of the land. Of course, it will be readily understood that in actuality the force tending to separate the porting plate 65 from the end wall 55 must be calculated for each cylinder, along with the surface area of the land 69a, in the area of its cylinder access port 97. Then the integrated average is taken of the resultant force acting around each of the annular ring of cylinder bores 96. However, the foregoing general formula for all cylinders is accurate enough to generally explain the problem and theory of operation.

The force acting upwardly to hold the porting plate 65 against the end wall 55 of casing 35 is the force generated by cylinder pressure against the transverse internal surface area of the cylinder bores 96 surrounding access ports 97. In practice, the force acting upwardly should be in excess of, and in the case of the relationship between the porting plate 65 and the end wall 55, substantially in excess of the force which is effective to act downwardly upon the porting plate 65. With this relationship properly established, the porting plate 65 has no tendency to be forced away from the inner wall 55.

The problem is very similar with the cylinder block 89 and the porting plate 65. In this case, the effective force tending to separate the cylinder block from the porting plate 65 is equal to the cylinder pressure plus the casing pressure times the surface area of land 103 divided by two. Again, to be precise, it will be understood that calculations should be made with respect to each cylinder bore 96 and access port 97 associated therewith and their relationship to the surface area of the land 103 immediately surrounding that access port but for general explanation purposes the aforedescribed formula is sufficiently accurate. Again, the effective force acting to hold the cylinder block 89 against the porting plate 65 is that force which is equal to the cylinder pressure times the effective transverse area within the cylinder bore surrounding the access port 97 in each bore.

In the case of the cylinder block 89 and the porting plate 65, the force differential is established in such a manner, by controlling the surface area of the land 103, as to maintain slightly more force tending to hold the cylinder block 89 against the porting plate 65 than that force which tends to move it away during fluid motor operation. The effect of this slight force differential is such that the cylinder block 89 seats well on the porting plate 65 but not so tightly as to break down the lubricating oil film therebetween. On the other hand, if the force differential is not quite great enough, too much oil escapes out of the cylinders between the plate 65 and cylinder block 89 to the periphery of the cylinder block within the casing 35.

The foregoing description of the pressure differential relationship between the cylinder block and porting plate 65 and the plate and end wall 55 of casing 35 is generally well known in the art. Accordingly, no attempt has been made to be specific, the details of this relationship forming no part of the present invention.

Referring again to FIGURE 1, it will be seen that the cylinder block 89 of the motor 20 extends at an angle of approximately 45° from the normally horizontal axis of rotation of the wheel 10. In other words, the axis of rotation of the cylinder block 89 is disposed at approximately a 45° angle to the axis of rotation of the swash plate 42. This angle is extremely important, as will readily be understood, since the larger it is, the larger the downward or working component of force becomes relative to the total force exerted on the swash plate 42 by the piston rods 105. In addition, as has previously been pointed out, as this angle increases the working stroke of each piston rod 105 in a corresponding bore 96 is increased and consequently the displacement of the fluid motor 20 itself, is increased. As has also been pointed out, it has in the past been standard procedure, by necessity, to establish the maximum angle between these axes at approximately 30°.

The drive mechanism which forms a basis for this invention is shown generally and collectively at 109 in FIGURE 1. It includes a novel ball and socket connection 109a between the pistons and the swash plate, acting in conjunction with the improved constant velocity joint 109b, hereinbefore generally referred to. The drive mechanism 109 facilitates establishment of an angle of approximately 45° between the axis of rotation of the swash plate 42 and the axis of rotation of the associated cylinder block 89 in the swash plate type fluid motor 20. In conjunction with this, the joint 109b embodies a construction which affords a predetermined maximum amount of axial dimensional latitude between the swash plate 42 and the cylinder block 89 without effecting the power transmission between these components to any noticeable degree.

The ball and socket connection 109a preferably includes an annularly disposed series of nine spherical sockets 111 in the fact of the swash plate 42. More or less sockets 111 might be utilized of course, depending upon the number of cylinders used in the motor 20. The sockets 111 are spaced at intervals corresponding generally to the annular spacing of the cylinder bores 96 in the cylinder block 89. Accordingly, each socket 111 is adapted to receive the ball joint 108 on the end of a corresponding piston rod 105. As is best seen in FIGURES 3 and 4, the spherical surface of each socket 111 encompasses an arc of greater than a hemisphere, herein approximately 220°. Thus, the diameter of the opening 111a in the swash plate for each of the sockets 111 is less than the spherical diameter of the socket.

Each of the ball joints 108 is of a spherical diameter substantially equal to the spherical diameter of a corresponding socket 111 and has a circumferentially disposed recess 112 symmetrically formed with respect to a great circle plane perpendicular to the longitudinal axis of the corresponding piston rod 105. Slightly rounded edges 113 facilitating lubrication of the ball and socket joints are provided at the junctures of the recesses 112 with the surface of each ball 108.

Since a recess 112 has been cut in the surface of each of the balls 108 about its circumference, it will be obvious that the projected diameter of each ball, in a plane perpendicular to the longitudinal axis of the piston rod 105, will be smaller than the spherical diameter of the ball. In this respect of course, the rounded edges 113 contribute to the reduction of diameter of each ball 108. This projected diameter is arranged to be the same or slightly smaller than the opening diameter 111a for each socket. Accordingly, a ball may be inserted in a corresponding 220° socket 111, in the manner shown in FIGURE 3, when the longitudinal axis of the piston rod 105 is perpendicular to the face of the swash plate 42. Since the diameter of each of the sockets 111 is substantially equal to the spherical diameter of a corresponding ball 108, once the ball is inserted in the socket 111 and turned into the position seen in FIGURE 4, a snug but sliding fit is established between the ball and socket. The piston rods 105 thus cannot be removed from this universal relationship with the swash plate 42 as long as they remain oblique to the face of the plate.

In establishing an angle of in the neighborhood of 45° between the axis of rotation of the cylinder block 89 and the axis of rotation of the swash plate 42, it will be seen in referring to FIGURE 1 that the longitudinal axis of each piston rod 105, as it approaches and passes through its uppermost position (top dead center) in a rotative cycle, will extend at a greater angle to the axis of rotation of the swash plate 42 than when the piston rod is in the region of its lowermost position (bottom dead center). This is due, of course, to the fact that as the axis of the rotating cylinder block is tilted from the horizontally disposed swash plate axis, the effective vertical diameter of the circle of sockets 111 in the swash plate 42 grows smaller. Consequently, the piston rods 105 are forced to converge slightly as they approach and pass through the uppermost and lowermost positions in their generally circular path. This relationship makes the angle between the piston rods and the axis of rotation of the swash plate 42 less than 45° in the region of bottom dead center and greater than 45° in the region of the top dead center.

To partially compensate for this narrowing of the effective vertical diameter of the circle of sockets 111 in the swash plate 42, the diameter of the circle is initially established at a value somewhat larger than the diameter of the circle of cylinder bores 96 in the cylinder block 89. If such a relationship were not established, at top and bottom dead center the piston rods 105 would tend to engage that side of the cylinder bore 96 which is closest to the center of the cylinder block 89. As a result, damage to the piston rods and cylinder bores might easily result. The circle of sockets 111 is made just large enough so that the necked down piston rods 105 as seen in FIGURE 1, come into closely adjacent relationship with the aforementioned innermost sides of the cylinder bores but do not actually contact the sides of the bore.

It follows then, as will be readily understood, that when the pistons are half way between top dead center and bottom dead center, that is in the center of a power stroke or an exhaust stroke, they will diverge slightly due to the fact that the diameter of the circle of sockets 111 is slightly larger than that of the circle of cylinder bores 96. Consequently, the necked down portion 107 of the piston rods 105 comes into closely adjacent relationship with the outermost sides of the cylinder bores 96. Thus it will be seen that a compromise must be made in establishing the diameter of the circle of sockets 111 and the diameter of the circle of cylinder bores 96 to obtain proper fluid motor operation without setting up an interference relationship between the piston rods 105 and the cylinder bores 96.

The extreme angular relationship hereinbefore described with regard to the drive connection between the ball joints 108 and the sockets 111 in the swash plate 42 is made possible by the utilization of a swash plate having a unitary, greater-than-hemispherical socket and a ball joint having a reduced projected diameter perpendicular to its longitudinal axis through formation of the recess 112, in conjunction with the necked down portion 107 of the piston rod 105. It is this unitary construction of the swash plate 42 and the piston rod retaining sockets 111, made possible by the unique construction of the ball joints 108, which permits establishing an angular relationship between the rods and the axis of rotation of the swash plate 42 in excess of 45°, far greater than the 30° maximum angle of prior swash plate devices. The 220° socket and reduced projected-area ball joint construction eliminates the need for a retaining plate and yet provides a drive connection which is, for all practical purposes, every bit as strong as the swash plate itself. Only a slight necking down of the piston rod 105 is necessary, as seen at 107, to facilitate moving the rod into an angular relationship in excess of 45° from the axis of rotation of the swash plate and consequently the piston rods themselves are not weakened to any noticeable extent. The benefits of such a construction have been carefully elicited above and include, among others, increased cylinder displacement without a corresponding increase in bore diameter as well as a relatively larger effective force component insofar as the driving pistons are concerned.

In addition, by virtue of this unique construction which eliminates the necessity for utilizating a clamping plate or the like to retain the ball joints 108 in their corresponding sockets 111, the internal walls of the sockets 111 may extend closer together. This is due to the fact that it is not necessary to provide stock between the sockets 111 for receiving attachment means such as plate holding bolts, for example, as required in prior art constructions. There need only be enough stock between the walls of adjoining sockets to provide the swash plate 42 with sufficient strength to retain the ball joints 108 under operational conditions.

As a result, of course, larger diameter ball joints 108 can be utilized than found possible in the aforementioned prior art constructions. Even larger diameter ball joints are permitted than under my Patent No. 2,947,182, dated August 2, 1960, entitled "Piston Ball End." As a consequence of the utilization of larger diameter ball joints 108, piston forces are more evenly distributed and balanced throughout the swash plate and wear is substantially reduced.

It is common practice in generally conventional swash plate type motors to provide means for synchronizing rotation of the cylinder block 89 with respect to the swash plate 42 so that these elements will rotate at exactly the same speed at all times. For reasons which are well known, a drive connection made solely between the cylinder carried piston rods 105 and the rotating swash plate 42 is inadequate for satisfactory motor operation. The plate and cylinder block frequently drift out of phase as the motor rotates because of the lateral play permitted the rods by the universal type connection of the ball and socket joints. In other words, the cylinder block tends to lead or lag the swash plate as they rotate. For proper operation of the motor, of course, it is necessary that the cylinder block 89 rotate at a constant velocity with respect to the swash plate 42. Consequently, it is conventional to provide a constant velocity universal joint as part of the drive connection 109 between the cylinder block 89 and the swash plate 42.

Figures 5, 6:
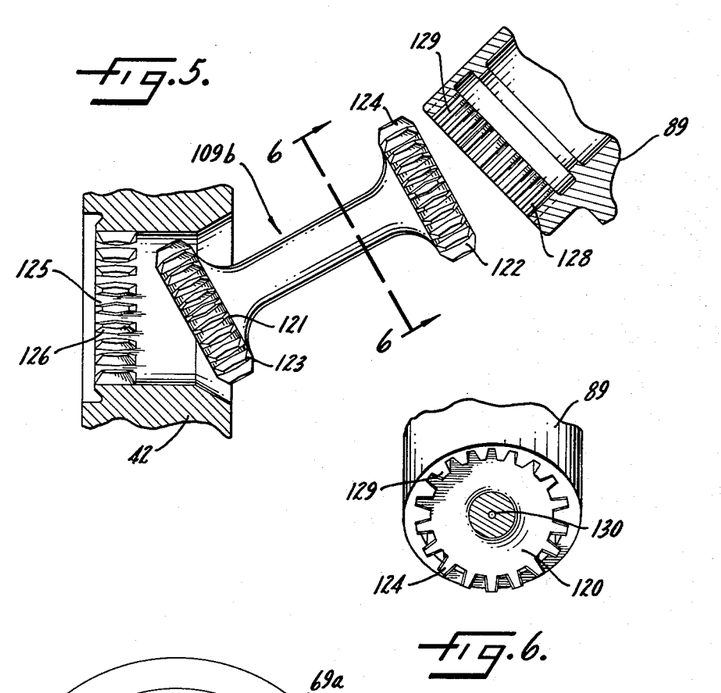
FIGURE 5 shows an enlarged fragmentary view, partially exploded, of the double ended joint forming a portion of the drive connection embodying this invention.
FIGURE 6 is a view taken along line 6—6 of FIGURE 5.

The new and improved constant velocity, or homokinetic, universal joint 109b is shown generally in FIGURE 1 and best seen in FIGURE 5, in exploded relationship. The improved construction of the joint 109b allows a substantial amount of axial dimensional tolerance between the swash plate 42 and the cylinder block 89. In other words, it is not necessary that the dimensional relationship between the cylinder block 89 and the swash plate 42, as it is established in the casing 35, be exact when this new and improved constant velocity joint 109b is utilized. It readily adapts itself to slight differences in overall axial dimensions of the fluid motor. In addition, since swash plate type devices of this general construction might be used, in modified form, as variable displacement pumps rather than fluid motors, any axial dimensional variation resulting from a change of the angle between the cylinder block and the swash plate is readily taken up by this new and improved constant speed joint 109b. The ramifications of the use of a drive connection embodying this invention with a variable displacement fluid device will be hereinafter discussed in more detail.

The new and improved joint 109b includes joint member 120 having a set 121 of annularly disposed gear teeth at one end thereof and another set 122 of annularly disposed gear teeth at the other end. The gear teeth 123 and 124 of sets 121 and 122, respectively, are preferably constructed in the manner disclosed in Patent No. 3,013,411, issued December 19, 1961, and entitled "Gear Type Constant Velocity Joint." These teeth might be characterized as having double helix configurations. In plan view, each tooth appears substantially diamond shaped.

The set 121 of double helix gear teeth 123 is adapted to mesh with an annularly disposed internal set 125 of identical double helix gear teeth within the confines of the ring-shaped swash plate 42. For reasons which will be hereinafter pointed out, the longitudinal axis of the joint member 120 extends at an angle of in the neighborhood of 30° from the axis of rotation of the swash plate 42. The helical angles of opposed faces of the meshing gear teeth 123 and 126 are consequently established at one-half of 30° or in the neighborhood of 15°, for example, to insure generally co-planar engagement of corresponding gear tooth faces as the swash plate and connector joint rotate.

This relationship is clearly described in the aforementioned co-pending application "Gear Type Constant Velocity Joint" and provides a constant speed relationship between the joint member 120 and the swash plate 42. As was also pointed out in the aforementioned co-pending application, the working clearance between corresponding internal and external gear teeth remains constant regardless of the angle between the axis of the joint member and the swash plate 42.

Since the angle between the axis of rotation of the joint member 120 and the axis of rotation of the swash plate 42 is in the neighborhood of 30°, it will be obvious that the angle between the former and the axis of rotation of the cylinder block 89 is in the neighborhood of 15°, or 45° minus 30°. The significance of this angle will be presently discussed.

Referring again to FIGURE 5, it will be seen that the cylinder block 89 is provided with an annularly disposed set 128 of internal gear teeth 129. The gear teeth 129, unlike the internal gear teeth 125 described in relation to the swash plate 42, have planar faces which are substantially parallel to the axis of rotation of the cylinder block 89.

The double helix gear teeth 124 associated with the set 122 on the corresponding end of connector joint 109b are formed in such a manner that their helical faces extend at an angle to the axis of rotation of the joint member 120 which is substantially equal to the angle between the axis of rotation of the connector joint and that of the cylinder block 89. Consequently, a generally axially sliding relationship is established between the set 122 of helical gear teeth 124 and the set 128 of planar faced gear teeth 129.

As will be understood, since the helical faced gear teeth 124 are entering and leaving meshing relationship with the planar faced gear teeth 128 at an angle of approximately 15°, a certain amount of play must be established between the teeth to facilitate unimpeded entry and departure of the helical faced teeth from engagement with the planar faced teeth without distortion of the metal adjacent the outer edges of the planar faced teeth. However, because the angle is small, this amount of play does not have to be substantial and consequently does not materially affect the operation of the joint.

This swash plate type fluid motor might be lubricated by fluid introduced to the motor from an outside source or it might be lubricated primarily by fluid leakage from the operation of the motor itself. Consequently, though in this case a leakage type system is illustrated, it will be understood that the illustration is merely exemplary.

The connector joint member 120 has a lubrication conduit 130 extending through its length, and a socket 131 at one end thereof seats over the ball joint 50 while a socket 132 at the other end seats over the ball joint 77. These ball and socket joints establish a fixed axis of rotation for the joint member. A series of three or more lubrication channels 133 (one of which is shown) extend from the lower end of lubrication conduit 130 into open communication with the interior of the casing 35. In the alternative, as seen in dotted lines at 134, a lubrication conduit or a plurality of these conduits might extend from further up in the lubrication conduit 130 into communication with the interior of the casing 35. Either type of lubrication conduit, 133 or 134 might be utilized, the only difference between the two being the fact that the discharge point of conduit 133 is closer to the axis of rotation than that of conduit 134 and consequently, as will be readily seen, fluid flowing therefrom is not discharged with the same amount of centrifugal force as it would be if discharged from conduit 134. The use of one or the other conduiting arrangement is but a matter of choice.

Assuming that a certain amount of lubricating fluid has been provided in the bottom of the casing 35 adjacent the junction with housing 16, and that more fluid leaks from the fluid motor during operation, it will be seen that as the motor 20 drives the swash plate 42, fluid will be thrown out by centrifugal force and tend to ride up the cylinder wall to a point where it loops over adjacent the periphery of the porting plate 65 and passes through a plurality of lubrication conduits 140 (only one of which is shown) and is carried inwardly into communication with lubrication ports 141 in the porting plate 65. Here the fluid passes into the depression 72 in cup-shaped element 71 and then through lubrication conduits 73 and 74 to empty into the socket 132 in the connector joint 109b. At this point the fluid lubricates the ball and socket joint 77, 132. Additional fluid passes on down the lubrication conduit 130 in the connector joint 109b to the lubrication conduit 133 where it lubricates ball and socket joint 50, 131 and passes outwardly by centrifugal force from the center of the ring-shaped swash plate 42 toward the edges thereof. This centrifugally dispersed lubricating fluid passes outwardly of the swash plate 42 and some of it provides lubrication for the ball bearings 40. At the same time, some of the oil is picked up in the recesses 112 surrounding the ball joints 108 on the ends of piston rods 105. As the fluid which is picked up in the recesses 112 is carried around while the swash plate rotates and each ball 108 moves in its socket 111, it is drawn between the surface of the balls 108 and the sockets 111 due to the rounded edges 113 of recesses 112 moving over the film of oil as the ball slides and rotates in the socket. As a result, important lubrication of the ball and socket joints is effected and substantial longer drive connection life is the result.

As has previously been pointed out, a drive connection embodying this invention, when utilized with a variable displacement fluid device, for example, incorporates additional unique features. An understanding of the peculiarities of use and operation of a variable displacement pump facilitates a clearer understanding of these features.

As will readily be understood, the angle between the axis of rotation of the swash plate and the axis of rotation of the cylinder block in a variable displacement pump might vary between zero and a maximum angle during operation, depending upon the pump output desired. Utilizing a ball and socket connection such as has been described herein in relation to a fluid motor, this maximum angle might be in the neighborhood of 45°. It will also be seen that ball and socket connections constructed in accordance with this invention are designed to be slidably assembled and disassembled when an angle of approximately zero exists between the axis of rotation of the swash plate and the axis of rotation of the cylinder block. In other words, though they are satisfactorily locked at any other angle but zero, or thereabouts, at this minimum angle the balls are freely removable from the sockets. Since such a relationship might exist frequently with a variable displacement fluid pump, it will be seen that it is highly desirable to have the balls locked in their corresponding sockets at all relative angles of the corresponding axes of rotation.

Figures 8, 9, 10, 11, 12:
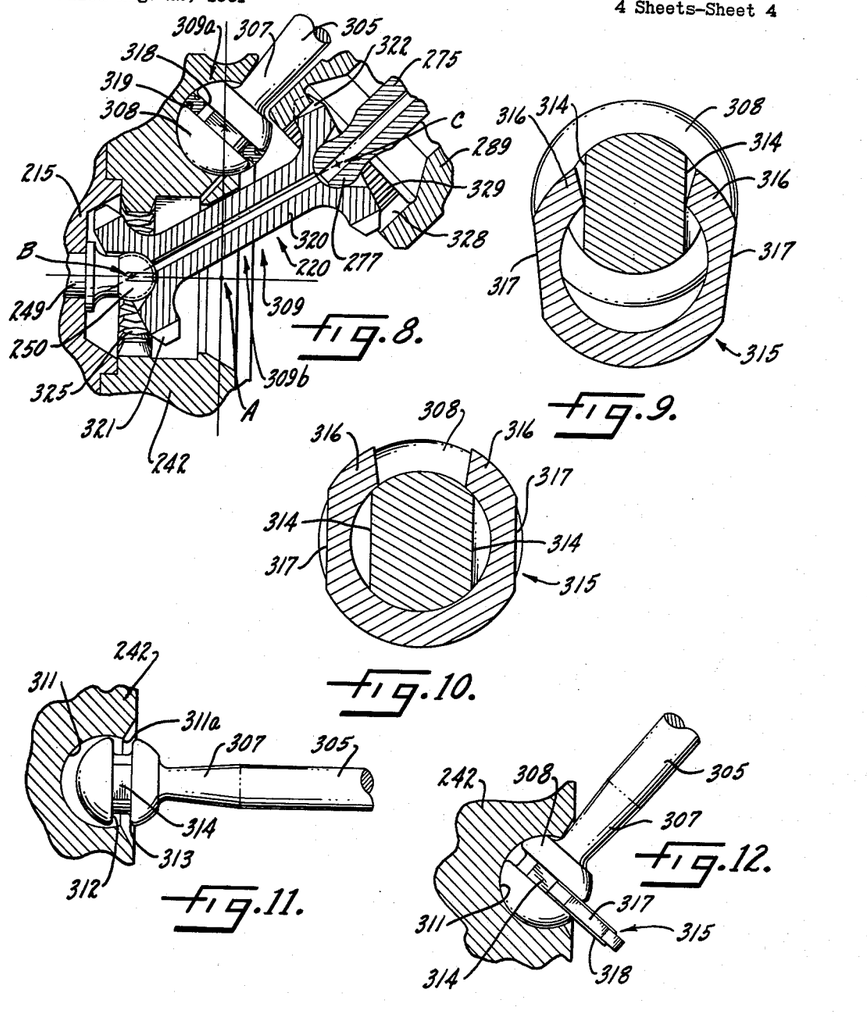
FIGURE 8 is an enlarged fragmentary view in section of a drive connection in a variable displacement pump, with parts broken away.
FIGURE 9 is an enlarged sectional view of a universal ball joint taken perpendicular to the axis of the ball on its circumference showing the locking means being inserted.
FIGURE 10 is a view similar to FIGURE 9 showing the locking means in operative relationship.
FIGURE 11 is an enlarged fragmentary view showing the ball and socket drive connection adapted to receive locking means, as it is assembled.
FIGURE 12 is a view similar to FIGURE 11 showing the locking means being inserted into operative relationship.

Referring to FIGURE 8, pertinent components of a swash plate type variable displacement pump are shown. They are substantially identical to the components of the swash plate type motor hereinbefore shown and described. In particular, a portion of a drive shaft 215 is rigidly secured in driving relationship to a fluid pump shown generally at 220. The pump 220 includes a ring shaped swash plate 242 secured to the shaft 215, which in turn carries a pin 249 having a universal ball joint 250 forming its outermost extremity and extending into the ring shaped swash plate.

Mounted opposite the swash plate 242, for rotation within a casing of well known construction (not shown), is a cylinder block 289. The block rotates about a supporting shaft of well known construction (not shown), which slidably carries a pin 275 having a universal ball joint 277 at its outermost extremity.

Nine piston rods 305, each having a piston head (not shown) are seated within cylinder bores in the cylinder block 89. The piston rods 305 each have a necked down portion 307 adjacent their outer ends and a spherical ball joint 308 at the outer extremity of the necked down portion. As with the swash plate type fluid motor 20 hereinbefore discussed, the immediately foregoing description of specific components of the swash plate type fluid pump 220 is general in nature. The construction described up to this point is well known or covered in other of the applicant's patents or patent applications and forms no part of this invention. Consequently, the brief description hereinbefore set out is thought sufficient to lay groundwork for an understanding of this facet of the invention.

The drive mechanism which forms a basis for this invention, in its adaptation to a swash plate type variable displacement pump, is shown generally and collectively at 309 in FIGURES 8 and 9. It includes the novel ball and socket connection 309a substantially identical to ball and socket connection 109a described in relation to the swash plate type fluid motor 20, acting in conjunction with an improved constant velocity joint 309b. This drive mechanism 309 facilitates the establishment of an angle of approximately 45° between the axis of rotation of the swash plate 242 and the axis of rotation of the associated cylinder block 289 in the swash plate type fluid pump 220. In addition, it contemplates means whereby a ball and socket connection is freely and easily assembled in a unique manner and readily provided with locking means for holding it in connected relationship at all angles of the axis of rotation of the swash plate 242 relative to the axis of rotation of the cylinder block 289.

In conjunction with these features, the joint 309b embodies a construction which readily adapts itself to a substantial axial dimensional variation between the swash plate 242 and the cylinder block 289 encountered during normal operation of the pump without effecting the power transmission between these components to any noticeable degree.

The ball and socket connection 309a preferably includes an annularly disposed series of nine spherical sockets 311 in the face of the swash plate 242. Each socket 311 is adapted to receive a ball joint 308 on the end of a corresponding piston rod 305. As seen in FIGURE 11, the spherical surface of each socket 311 encompasses an arc of greater than a hemisphere, herein approximately 220°. Thus, the diameter of the opening 311a in the swash plate for each of the sockets 311 is less than the spherical diameter of the socket.

Each of the ball joints 308 is of a spherical diameter substantially equal to the spherical diameter of the corresponding socket 311 and has a circumferentially disposed recess 312 symmetrically formed with respect to a great circle plane perpendicular to the longitudinal axis of the corresponding piston rod 305. Slightly rounded edges 313, facilitating the lubrication of the ball and socket joints, are provided at the junctures of the recesses 312 with the surface of each ball 308. As seen in FIGURES 11 and 12, flats 314 are formed on opposite sides of the ball 308 within the confines of the recess 312. These flats 314 facilitate the insertion of a unique split locking washer shown generally at 315 in FIGURES 8 and 9.

Since a recess 312 has been cut in the surface of each of the balls 308 about its circumference, it will be obvious that the projected diameter of each ball, in a plane perpendicular to the longitudinal axis of the piston rod 105, will be smaller than the spherical diameter of the ball. This projected diameter is arranged to be the same or slightly smaller than the opening diameter 311a for each socket. Accordingly, a ball may be inserted in a corresponding 220° socket 311 in the manner shown in FIGURE 11, when the longitudinal axis of the piston rod 305 is perpendicular to the face of the swash plate 242. Since the diameter of each of the sockets 311 is substantially equal to the spherical diameter of a corresponding ball 308, once the ball is inserted in the socket 311 and turned into the position seen in FIGURE 12, a snug but sliding fit is established between the ball and socket. The piston rods 305 thus cannot be removed from this universal relationship with swash plate 242 as long as they remain oblique to the face of the plate.

As has been pointed out, however, when the axis of rotation of the cylinder block 89 is moved into general axial alignment with the axis of rotation of the swash plate 242, in varying the output of the variable displacement pump, means must be provided for holding the ball and socket connection together or the balls 308 might inadvertently pop out of the sockets 311, which result would be, as can well be understood, highly undesirable. It is the unique locking washer 315 in combination with the ball and socket construction which provides this unique locking means.

Illustrations of the construction, use and operation of the locking clip 315 are shown clearly in FIGURES 9 through 12. As will be seen in FIGURES 9 and 10, for example, the clip 315 is generally horse-shoe shaped in construction having opposed ends 316 and flattened portions 317 along its sides. The diameter of the arcuate or circular portion of the clip is substantially equal to the inside diameter of a socket 311 while the distance transversely across the clip, between the flattened portions 317 along the sides of the clip, is slightly less than the diameter of the opening 311a into the socket 311. The distance between the opposed open ends 316 is calculated to be, and established at, a figure slightly less than the distance between the flats 314 formed within the confines of the recess 312 surrounding each ball point 308.

Referring again to FIGURE 8, it will be seen that the cross section of the clip 315 shows slightly beveled edges 318 formed on the annular inner surface of the clip while annular recesses 319 are formed in oppositely disposed relationship on its sides. These details of construction are provided to facilitate proper lubrication of the ring and ball joint in its seated relationship within the socket 108 and are not basic to the principles of the invention. Consequently, the cross section of the clip 315 might vary within limits, although the width of the broadest portion of the clip should be substantially equal to the width of recess 312.

Returning to FIGURE 12, when a ball joint 308 is inserted in a corresponding socket 311 and moved to its extreme angular relationship, the flats 314 on the opposite sides of the recess 312 are established such that they lie in a plane generally perpendicular to the plane of rotation of the swash plate 242. In that relationship, the clip 315, with its free ends 316 slightly spread to slide over the flats 314, as seen in FIGURE 9, can be inserted through the opening 311a of the socket 311. The flattened sides 317 of the clip 315 allow the clip to pass through the smaller opening 311a. In inserted relationship, the clip 315 appears substantially as its does in FIGURE 10, with the free ends 316 of the horse-shoe shaped clip hooked slightly over the ends of the flats 314 within the recess 312, as at 320. The clip is securely held in place by virtue of the fact that its generally horse-shoe shaped configuration provides it with resilient qualities.

It will now be seen that the ball and socket joint 309a will not become disengaged when an oblique angle between the axis of rotation of the swash plate 242 and the axis of rotation of the cylinder block 289, by virtue of the fact that the ball itself, in this relationship, is larger in diameter than the opening 311a to the socket 311. When the relationship of the aforedescribed axes is such that an angle of substantially zero exists therebetween, the clip 315 prevents disengagement of the ball and socket connection since its outside diameter is substantially equal to the inside diameter of the socket 311 and larger than the diameter of the socket opening 311a. To remove the clip and consequently the ball 308 from the socket 311, the maximum angle of 45° is established between a piston rod 305 and the axis of rotation of the swash plate 242, the clip 315 is sprung out with a screw driver, for example, the ball 308 rotated downwardly until the piston rod 305 lies generally parallel to the axis of rotation of the swash plate 242 and the ball then removed from the socket 311.

As has hereinbefore been pointed out, it is common practice in swash plate type fluid devices to provide a constant velocity universal joint as part of the drive connection between the cylinder block and swash plate. The constant velocity universal joint 309b shown in FIGURES 8 and 9 permits the necessary axial dimensional variation between the swash plate 242 and the cylinder block 289 of the variable displacement pump without any substantial effect on the constant velocity characteristics of the joint itself.

The new and improved joint 309b includes a joint member 320 substantially identical to the joint member 120 hereinbefore described in relation to the drive connection 109 in swash plate type fluid motor 20. It is provided with sets 321 and 322 of annularly disposed double helical gear teeth at either end in the manner of joint member 120 and as disclosed in my aforementioned co-pending application entitled "Gear Type Constant Velocity Joint."

An annularly disposed internal set 325 of identical double helix gear teeth is formed within the ring shaped swash plate 242, while the cylinder block 289 is provided with an annularly disposed set 328 of internal gear teeth 329 which have planar faces substantially parallel to the axis of rotation of the cylinder block 289. The axial length of the internal gear teeth 329 of the set 328 is substantial for reasons which will be described immediately hereinafter.

It will be seen in FIGURE 8 that the axis about which the cylinder block 89 pivots in varying its displacement is substantially at A. On the contrary, however, the axis about which the joint member 320 pivots is B. Consequently, when the axes of rotation of the cylinder block 289 and the swash plate 242 are substantially in alignment, the pivotal point B and the pivotal point C of the other end of the joint member 320 will be farther apart than they are when any other angle exists between the afore-described axes and substantially farther apart than they are when the maximum angle of 45° exists between these axes.

As a result of this varying dimensional relationship, one end of the joint member 320 must move relative to either the swash plate 242 or the cylinder block 289. It is the relationship between the double helical set of gear teeth 322 on the joint member 320 and the planar faced gear teeth 329 within the cylinder block which facilitates this movement. The slidably mounted pin 275 permits the set 322 of helical teeth to slide relative to the planar faced gear teeth 329 as the angle between the axes of rotation of the swash plate 242 and the cylinder block 289 is varied in varying the displacement of the pump.

Again, as will be understood, since the set 322 of helical faced gear teeth are entering and leaving meshing relationship with the planar faced gear teeth 329 at an angle preferably in the neighborhood of 15°, a certain amount of play must be established between the teeth to facilitate unimpeded entry and departure of the helical faced teeth from engagement with the planar faced teeth without distortion of the metal adjacent the outer edges of the teeth. However, because the angle is small this amount of play does not have to be substantial, and does not materially affect the operation of the joint.

The lubrication system for the swash plate type fluid pump 220 generally and the ball 308 and socket 311 joint construction specifically is substantially identical to that described in relation to the swash plate type fluid pump 20. Consequently, it is not thought necessary that the lubrication system be discussed again since it is ancillary to the invention.

In essence, it will be seen that an improved drive connection between the piston carrying cylinder and swash plate of a swash plate type fluid device has been shown and described. It embodies a simpler construction than any heretofore known while facilitating the establishment of a 45° angle between the axis of rotation of the cylinder block and that of a corresponding swash plate. This, in effect, provides increased displacement and relatively effective force components exerted by the piston rods and consequently results in an increased torque output. Where the fluid device is a variable displacement swash plate type fluid pump, unique locking means are provided for retaining the ball and socket in action in operative relationship throughout the range of operation of the variable displacement pump.

In addition, the drive connection includes new and improved constant speed joint means which permit a substantial amount of axial dimensional tolerance between the swash plate and the cylinder block and consequently lower manufacturing costs for the motor since precision tolerances between cylinder, joint, and block are not required in the manufacture and assembly of the motors. In conjunction with this, of course, a substantially constant speed joint is provided between the rotating cylinder blocks and the swash plate. In the event a swash plate device incorporating such a joint is utilized in its variable displacement form, substantially no variation is realized in the constant speed properties of the joint throughout its variable speed range.

Although several variations on this invention have been described herein, it will be understood that others might fall within its purview and that various modifications and improvements might be made therein. It is intended to cover in the appended claims all such variations, modifications and improvements as fall within the true spirit and scope of the invention.

What is desired to be claimed and secured by Letters Patent of the United States is:

1. A swash plate type fluid device comprising a swash plate mounted for rotation about a predetermined axis, a cylinder block mounted for rotation about an axis oblique to said first mentioned axis, the maximum permissible angle between said axes being substantially in excess of 30°, said block having a plurality of cylinders therein, piston rods reciprocable in said cylinders and a drive connection between said cylinder block and said swash plate, said drive connection including ball joints on the free ends of said piston rods and corresponding sockets in said swash plate, each of said sockets being unitary with said plate and enclosing an arc in excess of 180°, said ball joints having circumferentially disposed relief means thereon decreasing the projected circumference thereof in a plane perpendicular to the axes of corresponding piston rods whereby said ball joints are freely insertable in said sockets when said rods are generally parallel to the axis of rotation of said swash plate and universally retained therein when said rods extend obliquely to said last mentioned axis throughout each rotational cycle of said swash plate and cylinder block.

2. The device of claim 1 further characterized in that the angle between the axis of rotation of said cylinder block and the axis of rotation of said swash plate is in the neighborhood of about 45°.

3. The device of claim 1 further characterized in that each of said sockets encloses an arc in the neighborhood of 220°.

4. A swash plate type fluid device comprising a swash plate mounted for rotation about a predetermined axis, a cylinder block mounted for rotation about an axis angularly displaceable from said predetermined axis in excess of 30°, said block having a plurality of cylinders therein, piston rods reciprocable in said cylinders and a drive connection between said cylinder block and said swash plate, said drive connection including a plurality of annularly disposed sockets in said swash plate, each of said sockets being unitary with said plate and enclosing an arc in excess of 180°, and ball joints on the free ends of said piston rods, said ball joints having circumferentially disposed recesses thereon decreasing the projected circumference of said ball joints in a plane generally perpendicular to the axes of corresponding piston rods such that said ball joints are adapted to be freely insertable in corresponding sockets when said rods are generally parallel to the axis of rotation of said swash plate and universally retained therein when said rods are in operative position oblique to said last mentioned axis, and locking means insertable in said recesses between said ball joints and said sockets only when said rods extend at an oblique angle to said predetermined axis, whereby said ball joints are then universally held in said sockets when they are generally parallel to the axis of rotation of said swash plate.

5. The device of claim 4 further characterized in that each of said sockets encloses an arc of in the neighborhood of 220°.

6. The device of claim 4 further characterized in that said locking means includes generally U-shaped snap rings adapted to be snapped around each ball joint and seated in a corresponding recess when said rods extend at said oblique angle to said predetermined axis.

7. The device of claim 6 further characterized in that each of said snap rings has one transverse outer dimension which is slightly less than the diameter of opening to a corresponding socket and another transverse outer dimension which is substantially equal to the diameter of said corresponding socket.

8. The device of claim 6 further characterized in that each of said snap rings has opposed open jaws, oppositely disposed flat surfaces being formed on each of said ball joints in corresponding recesses, the distance between said jaws being slightly less than the distance between said flat surfaces on each ball joint such that a corresponding snap right can be snapped over said ring and seated in a corresponding recess with said jaws overlying the ends of said flat surfaces whereby said snap rings are resiliently locked in place.

9. A swash plate type fluid device comprising a swash plate mounted for rotation about a predetermined axis, a cylinder block mounted for rotation about an axis angularly displaceable from said predetermined axis in excess of 30°, said block having a plurality of cylinders therein, piston rods reciprocable in said cylinders and a drive connection between said cylinder block and said swash plate, said drive connection including a plurality of annularly disposed sockets in said swash plate, each of said sockets being unitary with said plate and enclosing an arc in excess of 180°, and ball joints on the free ends of said piston rods, said ball joints having circumferentially disposed recesses thereon decreasing the projected circumference of each of said ball joints in a plane generally perpendicular to the axis of said piston rods such that said ball joints are adapted to be freely insertable in said sockets when said rods are generally parallel to the axis of rotation of said swash plate and universally retained therein when said rods extend obliquely to said last mentioned axis, the juncture of said recesses with the surface of said balls being slightly rounded to facilitate the entry of lubricating fluid between the surfaces of said balls and said sockets, and locking means insertable in said recesses between said ball joints and said sockets only when said rods extend at an oblique angle to said predetermined axis, whereby said ball joints are then universally held in said sockets when they are generally parallel to the axis of rotation of said swash plates.

10. A variable displacement fluid pump including a swash plate mounted for rotation about a predetermined axis, a cylinder block mounted for rotation about an axis angularly displaceable from said predetermined axis in excess of 30 degrees, said block having a plurality of cylinders therein, piston rods reciprocable in said cylinders and a drive connection between said cylinder block and said swash plate, said drive connection including ball joints on the free ends of said piston rods and corresponding sockets in said swash plate, each of said sockets being unitary with said plate and enclosing an arc in excess of 180 degrees, said ball joints adapted to be freely insertable in said sockets when said rods are generally parallel to the axis of rotation of said swash plate and slidably retained therein when said rods extend obliquely to said last mentioned axis, and locking means insertable between said ball joints and said sockets only when said rods extend at a predetermined oblique angle to said predetermined axis such that said ball joints are then universally held in said sockets when they are generally parallel to the axis of rotation of said swash plate during the operation of said variable displacement pump.

11. A variable displacement fluid pump including a swash plate mounted for rotation about a predetermined axis, a cylinder block mounted for rotation about an axis angularly displaceable from said predetermined axis in excess of 30 degrees, said block having a plurality of cylinders therein, piston rods reciprocable in said cylinders and a drive connection between said cylinder block and said swash plate, said drive connection including ball and socket joints between said piston rods and said swash plate, locking means insertable in said ball and socket joints only when said rods extend at an oblique angle to said predetermined axis, whereby said locking means is adapted to retain said ball and socket joints in cooperative relationship throughout the operational range of said fluid pump, said drive connection further including a constant speed joint for rigidly synchronizing the rotation of said cylinder block and said swash plate, said constant speed joint comprising an annularly disposed set of gear teeth having double helical faces on said swash plate, a double ended connector joint, an annularly disposed set of gear teeth having double helical faces on one end of said connector joint, said external and internal double helical gear teeth being in mesh and establishing a substantially constant speed joint between said swash plate and said connector joint, an annularly disposed internal set of generally planar faced gear teeth in said cylinder block, the planar faces of said gear teeth being substantially parallel to the axis of rotation of said cylinder block and being of substantial length, an annularly disposed external set of gear teeth having double helical faces on the other end of said connector joint, said last mentioned external and internal gear teeth being in mesh throughout the operational range of said fluid pump as the angle between said axes varies.

References Cited by the Examiner

UNITED STATES PATENTS

| | | | |
|---|---|---|---|
| 453,852 | 6/91 | Berry | 121—62 |
| 2,526,072 | 10/50 | Fraser | 64—7 |
| 2,617,278 | 11/52 | Sindelar | 64—21 |
| 2,649,741 | 8/53 | Hendrichson | 103—62 |
| 2,733,665 | 2/56 | Klopp | 103—162 |
| 2,834,297 | 5/58 | Postel et al. | 103—162 |
| 2,984,995 | 5/61 | Kalen | 64—7 |
| 3,003,399 | 10/61 | Donner | 287—87 |
| 3,013,411 | 12/61 | Wahlmark | 64—21 |
| 3,050,014 | 8/62 | Sullivan | 103—162 |

LAURENCE V. EFNER, *Primary Examiner.*
JOSEPH H. BRANSON, JR., *Examiner.*

UNITED STATES PATENT OFFICE
CERTIFICATE OF CORRECTION

Patent No. 3,192,868                                               July 6, 1965

Gunnar A. Wahlmark

It is hereby certified that error appears in the above numbered patent requiring correction and that the said Letters Patent should read as corrected below.

Column 14, line 9, for "point" read -- joint --; column 17, line 12, for "right" read -- ring --.

Signed and sealed this 28th day of December 1965.

(SEAL)
Attest:

ERNEST W. SWIDER                                        EDWARD J. BRENNER
Attesting Officer                                             Commissioner of Patents